US012648558B2

(12) United States Patent
Chan et al.

(10) Patent No.: US 12,648,558 B2
(45) Date of Patent: Jun. 9, 2026

(54) BIOCHIP FOR CRYOPRESERVATION OR THAWING AND RESUSCITATION OF BIOLOGICAL TISSUE

(71) Applicant: Shen Zhen Biorocks Biotechnology Company Limited, Shenzhen (CN)

(72) Inventors: Ho Nam Chan, Tseung Kwan O (CN); Yiwei Shu, Tseung Kwan O (CN)

(73) Assignee: Shen Zhen Biorocks Biotechnology Company Limited, Shenzhen (CN)

( * ) Notice: Subject to any disclaimer, the term of this patent is extended or adjusted under 35 U.S.C. 154(b) by 477 days.

(21) Appl. No.: 18/279,639

(22) PCT Filed: Mar. 1, 2022

(86) PCT No.: PCT/CN2022/078601
§ 371 (c)(1),
(2) Date: Aug. 31, 2023

(87) PCT Pub. No.: WO2022/184050
PCT Pub. Date: Sep. 9, 2022

(65) Prior Publication Data
US 2024/0138400 A1 May 2, 2024

(30) Foreign Application Priority Data
Mar. 3, 2021 (CN) .......................... 202120458333.4

(51) Int. Cl.
*A01N 1/142* (2025.01)
*A01N 1/147* (2025.01)
*B01L 7/00* (2006.01)

(52) U.S. Cl.
CPC ............. *A01N 1/142* (2025.01); *A01N 1/147* (2025.01); *B01L 7/50* (2013.01)

(58) Field of Classification Search
CPC ...... A01N 1/142; A01N 1/147; A01N 1/0268; A01N 1/0263; B01L 7/50; B01L 7/52;
(Continued)

(56) References Cited

U.S. PATENT DOCUMENTS

| | | | | |
|---|---|---|---|---|
| 2010/0297600 A1* | 11/2010 | Cecchi | ................... | C12M 23/12 |
| | | | | 435/1.3 |
| 2014/0157798 A1* | 6/2014 | Jimenez-Rios | ........ | A01N 1/147 |
| | | | | 62/62 |
| 2019/0141986 A1 | 5/2019 | Inui | | |

FOREIGN PATENT DOCUMENTS

| | | |
|---|---|---|
| CN | 202738683 | 2/2013 |
| CN | 203851692 | 10/2014 |

(Continued)

OTHER PUBLICATIONS

International Search Report and Written Opinion for Application No. PCT/CN2022/078601 dated May 26, 2022.

*Primary Examiner* — Michael L Hobbs
(74) *Attorney, Agent, or Firm* — KDW FIRM PLLC

(57) ABSTRACT

Disclosed in the present invention is a biochip for cryo-preservation or thawing and resuscitation of biological tissue, with four ends of the biochip being of a closed structure. The biochip includes: a section region, which is arranged in the middle and includes a plurality of sequentially arranged sections, with partition plates being provided between the sections, and the bottom of each section being provided with a fixing groove; and joint portions arranged on two sides of the section region. In the biochip having four ends being of a closed structure as provided in the present invention, a hydrogel or solution can be encapsulated in the plurality of sections of the biochip, such that the device is simple to operate and can effectively improve the efficiency of cryo-preservation or thawing and resuscitation of embryos.

7 Claims, 4 Drawing Sheets

(58) Field of Classification Search
CPC ......... B01L 3/502715; B01L 2200/027; B01L
2300/0672; B01L 2300/0887; B01L
2300/047; B01L 2300/0816; B01L
2300/044; B01L 2400/0481; B01L
2400/0694; B01L 2400/086; B01L
2400/0677; B01L 2400/0406; B01L
2400/0683; G01N 33/5005
See application file for complete search history.

(56) References Cited

FOREIGN PATENT DOCUMENTS

| CN | 207653420 | 7/2018 |
|----|-----------|--------|
| CN | 215775135 | 2/2022 |
| WO | 2021025017 A1 | 2/2021 |

* cited by examiner

BIOCHIP FOR CRYOPRESERVATION OR THAWING AND RESUSCITATION OF BIOLOGICAL TISSUE

TECHNICAL FIELD

The invention relates to the technical field of bioengineering, in particular to a biochip for cryopreservation or thawing and resuscitation of biological tissues.

BACKGROUND

Cell cryopreservation is an important technology in many biological fields, as is the restoration of cells from a cryopreserved state to a normal metabolic state. This process of thawing and resuscitation involves a process of removing cryoprotectant and replacing it with normal culture medium.

The device used in the freezing or thawing of embryos in the prior art has the problems of complex operation, low efficiency and the like.

SUMMARY

The invention mainly aims at providing a biochip for cryopreservation or thawing and resuscitation of biological tissue, so as to solve the problems of complex operation, low efficiency and the like in the freezing or thawing process of embryos with the device of the prior art.

According to the embodiment of the invention, a biochip for cryopreservation or thawing and resuscitation of biological tissue is provided, with four ends of the biochip being of a closed structure. The biochip includes: a section region, which is arranged in the middle and includes a plurality of sequentially arranged sections, with partition plates being provided between the sections, and the bottom of each section being provided with a fixing groove; and joint portions arranged on two sides of the section region.

Wherein, the bottom of the section region is also provided with a sealing film that forms the plurality of sections into a plurality of recesses.

Wherein, the sealing film is provided with a direction mark.

Wherein, the bottom of the section region is further provided with a permeable film that forms the plurality of sections into a plurality of recesses.

Wherein, one end of the biochip is configured to have one or two chamfers or bevels.

Wherein, a transparent baffle is further arranged above the biochip, and the transparent baffle covers a middle part of the section region.

Wherein, the section region is configured to have two, three or four sections.

According to the technical solution of the invention, by providing a biochip with four ends being of a closed structure, a hydrogel or solution can be encapsulated in the plurality of sections of the biochip, such that the present device is simple to operate and can effectively improve the efficiency of cryopreservation or thawing and resuscitation of embryos.

BRIEF DESCRIPTION OF THE DRAWINGS

The drawings described herein are used to provide a further understanding of the invention and form a part of the present application. The illustrative embodiments of the invention and the description thereof are used to explain the invention and are not unduly limiting the invention. In the drawings.

DETAILED DESCRIPTION

In order to make the purpose, technical solution and advantages of the invention clearer, the technical solution of the invention will be clearly and completely described below in combination with the specific embodiments of the invention and the corresponding drawings. Apparently, the described embodiments are only part of the embodiments of the present invention, but not all of them. Based on the embodiments in the invention, all other embodiments obtained by persons of ordinary skill in the art without making creative labor are within the scope of protection of the present invention.

The technical solution provided by various embodiments of the present invention is described below in detail with reference to the accompanying drawings.

Figure 1:
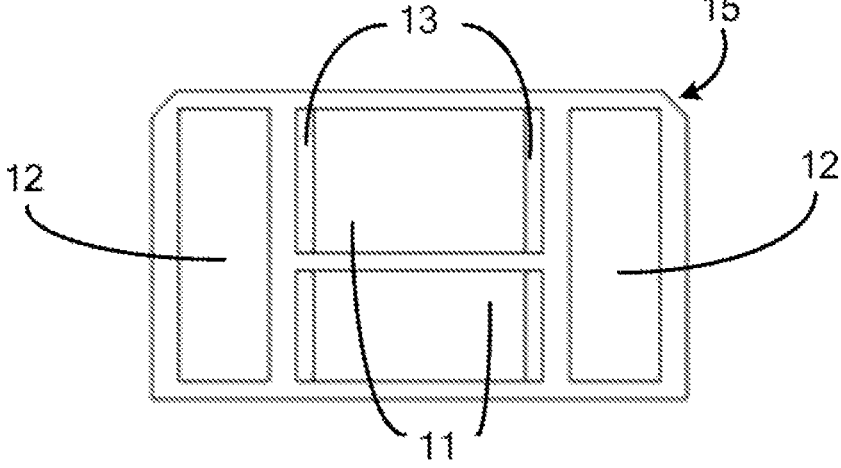
FIG. 1 is a schematic diagram of a 2-section biochip according to an embodiment of the invention.
Figure 2:
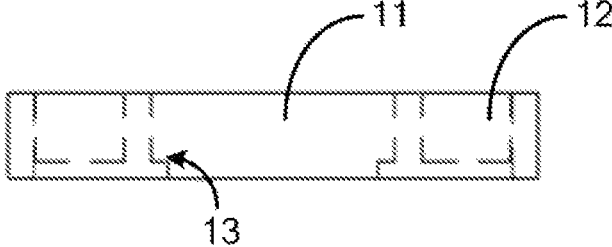
FIG. 2 is a schematic view of the cross section of FIG. 1.
Figure 3:
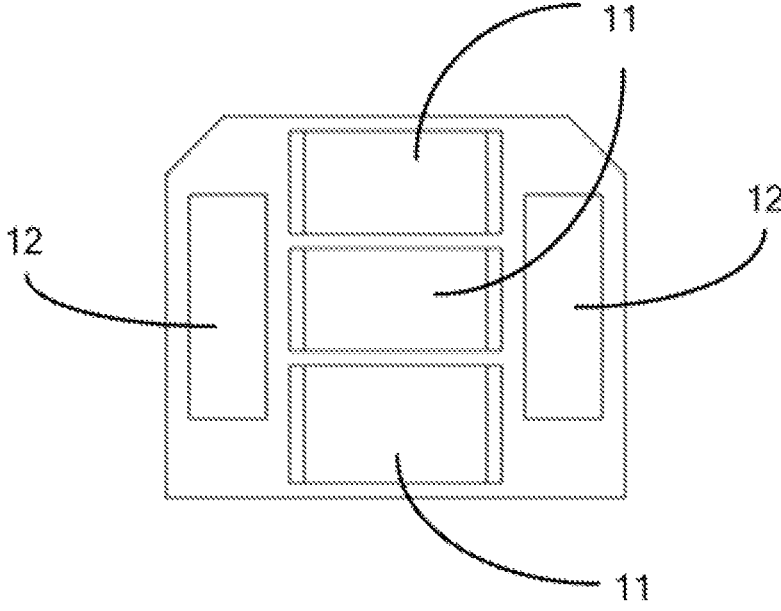
FIG. 3 is a schematic diagram of a 3-section biochip according to an embodiment of the invention.

Referring to FIGS. 1 to 3, the biochip according to the embodiment of the present application is generally of a cuboid structure, and the biochip mainly includes: a section region arranged in the middle and joint portions 12 arranged on two sides of the section region, and the joint portions 12 can be used to hold a magnet or a recess for use in combination with a propulsion device. The biochip is of a structure with four ends closed. In practical application, embryos are placed in a recess of the carrier, and more culture solution is added to fill the recess and a bulging droplet of culture solution appears above the recess. Since there is excess culture solution above the recess, once the biochip with a closed structure comes into contact with the excess culture solution, the slit between the biochip and the carrier will be filled with the excess culture solution (due to capillary action). After the slit is filled, it will not affect the embryos that come later.

In an embodiment of the present application, one or two chamfers or bevels 15 may be provided at one end of the biochip. The chamfer or bevel 15 is used to indicate the correct placement direction of the biochip, i.e., the one end with chamfer or bevel faces the embryos, so that the section close to the chamfer or bevel contacts the embryos first, and the section away from the bevel contacts the embryos later.

The section region includes a plurality of sequentially arranged sections 11. Partition plates are provided between adjacent sections, and the partition plates divide the section region into independent sections. The sections are used to encapsulate different types of hydrogels or solutions, and the number of sections required varies in different usage environments. For example, in freezing applications, as shown in 3
4

FIG. 1, the biochip includes two sections; In thawing applications, as shown in FIG. 3, the biochip includes three sections. In addition, in some embodiments, four sections may be provided, and the extra section may be used to encapsulate a solution of a different concentration to slow down the change in osmotic pressure, so that the embryos suffer from less osmotic pressure damage.

Embodiments of the present application are described below in connection with practical application scenarios.

In the process of cryopreservation or thawing and resuscitation of biological tissues (such as embryos, eggs, cells, and other biological materials), the biochip according to the embodiments of the present application is used for encapsulating chemicals placed therein, which can be in a solid form made in the form of hydrogels or in a solution form.

In the case of hydrogels used in freezing applications, the biochip includes two sections, which encapsulate equilibration solution (ES) hydrogels and vitrification solution (VS) hydrogels, respectively. Specifically, a sealing film is attached to the bottom of the biochip, and the sections of the biochip are formed into two recesses. ES hydrogel solution and VS hydrogel solution are filled into the two recesses respectively, and after the hydrogel is cured, a sealing film is attached to the top of the biochip. At this time, the hydrogels in each section are separated and sealed to increase the preservation time. Fixing grooves 13 are respectively arranged on two sides of the bottom of each section, which are used for fixing the position of the hydrogel after curing, so as to avoid pulling the hydrogel out of the section when tearing off the sealing film. Two bevels are provided at one end of the biochip, which are used for indicating the correct placement direction of the biochip, that is, the section filled with ES hydrogel close to the bevel contacts the embryos first, and the section filled with VS hydrogel away from the bevel contacts the embryos later. In addition, direction marks (such as arrows) can also be printed on the sealing films to indicate the correct placement direction of the biochip. When freezing, the carrier is filled with culture solution, the upper and lower sealing films of the biochip are torn off, and the biochip is placed following the indicated direction, so that the biochip is closely attached above the carrier. Then, the biochip is moved relative to the carrier, and the ES hydrogel and VS hydrogel in the sections of the biochip contact the embryos in the recess of the carrier in sequence to deliver the cryoprotectant. After delivery, the biochip is separated from the carrier, and the carrier is put into liquid nitrogen for freezing.

In the case of hydrogels used in thawing applications, the biochip includes three sections, which encapsulate thawing solution (TS) hydrogels, diluent solution (DS) hydrogels and washing solution (WS) hydrogels, respectively. Specifically, a sealing film is attached to the bottom of the biochip, and the sections of the biochip are formed into three recesses. The TS, DS and WS hydrogel solutions are filled into three recesses, respectively. After the hydrogels are cured, a sealing film is attached to the top of the biochip. At this time, the hydrogels in each section are separated and sealed to increase the preservation time. Fixing grooves 13 are respectively arranged on two sides of the bottom of each section, which are used for fixing the position of the hydrogel after curing, so as to avoid pulling the hydrogel out of the section when tearing off the sealing film. One end of the biochip is provided with two bevels for indicating the correct placement direction of the biochip, that is, the section filled with TS hydrogel close to the bevel contacts the embryos first, the section filled with DS hydrogel in the middle contacts the embryos later, and the section filled with WS hydrogel away from the bevel contacts the embryos last. In addition, direction marks (such as arrows) can also be printed on the sealing films to indicate the correct placement direction of the biochip. When thawing, the carrier is taken out from the liquid nitrogen and put into the oil phase thawing solution which has been preheated to 37° C. for thawing and rewarming. After the carrier is thawed and rewarmed, the upper and lower sealing films of the biochip are torn off, and the biochip is placed following the indicated direction, so that the biochip is closely attached above the carrier. The biochip is then moved relative to the carrier, and the TS, DS and WS hydrogels in the sections of the biochip contact the embryos in the recess of the carrier in sequence to remove the cryoprotectant in the embryos. After removal, the biochip is separated from the carrier, and the embryos are recovered from the recess of the carrier by using a glass capillary into a Petri dish for culture.

In the case of solutions used in freezing applications, the biochip includes two sections, which encapsulate ES solution and VS solution, respectively. Specifically, a permeable film is first attached to the bottom of the biochip, and a sealing film is attached to the top of the biochip, so that the sections of the biochip are formed into two recesses. Two bevels are provided at one end of the biochip, which are used to indicate the correct placement direction of the biochip, that is, ES solution will be added to the section close to the bevel to contact the embryos first when being used, and VS solution will be added to the section away from the bevel to contact the embryos later when being used. In addition, direction marks (such as arrows) can be printed on the sealing films to indicate the correct placement direction. When freezing, the carrier is filled with culture solution, the sealing film on the top of the biochip is torn off, and the biochip is placed following the indicated direction, so that the biochip is closely attached above the carrier. The desired solutions (such as ES and VS) are filled into the corresponding sections of the biochip, and the biochip is then moved relative to the carrier. The ES and VS solutions in the sections of the biochip will pass through the permeable film by diffusion and contact the embryos in the recess of the carrier in sequence to deliver the cryoprotectant. After delivery, the biochip is separated from the carrier, and the carrier is put into liquid nitrogen for freezing.

In the case of solutions used in thawing applications, the biochip includes three sections, which encapsulate TS solution, DS solution and WS solution respectively. Specifically, a permeable film is first attached to the bottom of the biochip, and a sealing film is attached to the top of the biochip, so that the sections of the biochip are formed into three recesses. Two bevels are provided at one end of the biochip, which are used to indicate the correct placement direction of the biochip, that is, TS solution will be added to the section close to the bevel to contact the embryos first when being used, DS solution will be added to the middle section to contact the embryos later when being used, and WS solution will be added to the section away from the bevel to contact the embryos last when being used. In addition, direction marks (such as arrows) can also be printed on the sealing film to indicate the correct placement direction of the biochip. When thawing, the carrier is taken out from the liquid nitrogen and put into the oil phase thawing solution which has been preheated to 37° C. for thawing and rewarming. After the carrier is thawed and rewarmed, the sealing film on the top of the biochip is torn off, the biochip is placed following the indicated direction, and the biochip is closely attached above the carrier. The desired solutions (such as TS, DS and WS) are filled into the corresponding sections of the biochip, and the biochip is then moved relative to the carrier. The TS, DS and WS solutions in the sections of the biochip will pass through the permeable film by diffusion and contact the embryos in the recess of the carrier in sequence, so that the cryoprotectant in the recess of the carrier and that in the embryos will diffuse into the solution of the biochip, thus achieving the purpose of removing the cryoprotectant in the embryos. After removal, the biochip is separated from the carrier, and the embryos are recovered from the recess of the carrier by using a glass capillary into a Petri dish for culture.

Figure 4:
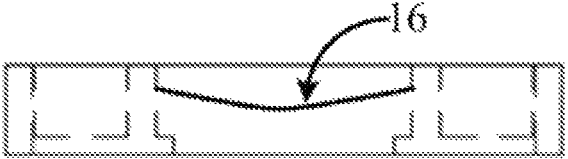
FIG. 4 is a schematic diagram of the curved surface shown in FIG. 2.
Figure 5:
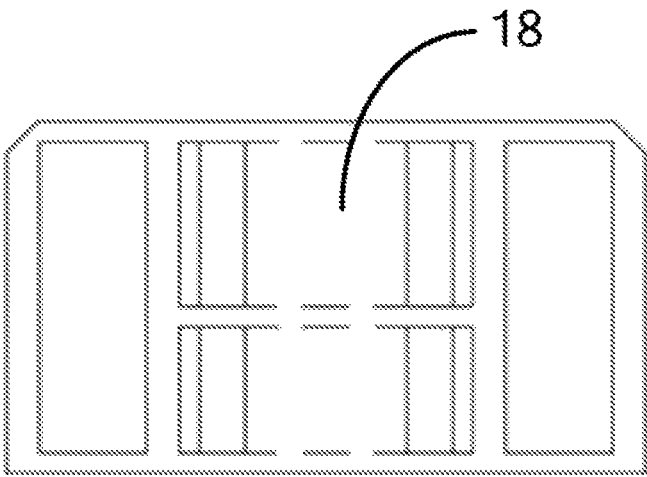
FIG. 5 is a schematic diagram of a biochip including a transparent baffle according to an embodiment of the present invention.
Figure 6:
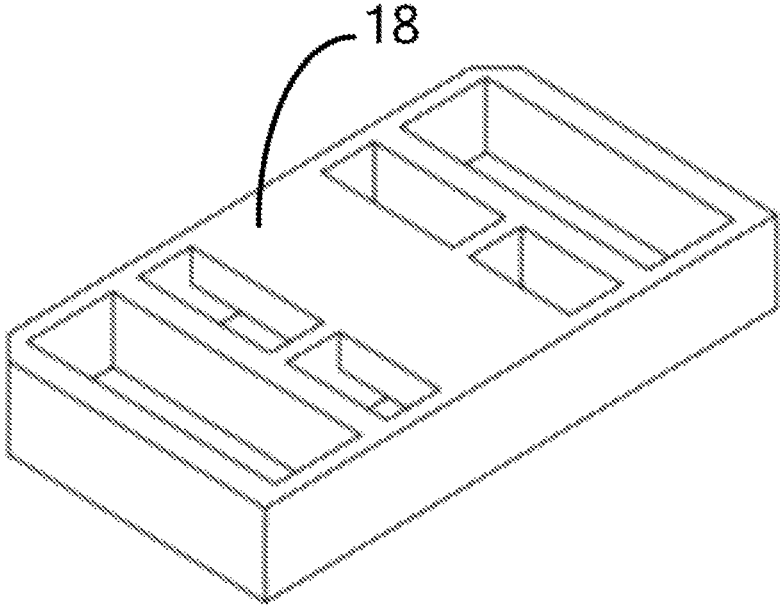
FIG. 6 is a three-dimensional schematic diagram of a biochip including a transparent baffle according to an embodiment of the present invention.
Figure 7:
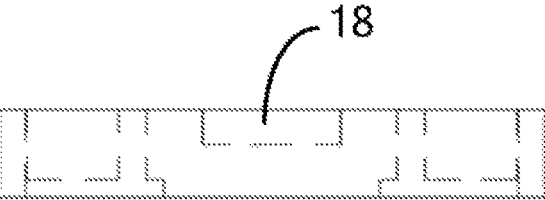
FIG. 7 is a schematic view of the cross section of FIG. 5.

Referring to FIG. 4, when the solutions are filled into the sections of the biochip, the liquid level of the solution close to both sides is higher due to capillary action, thus forming a curved surface 16, which will cause the optical path of the microscope to change, and it is impossible to observe the morphological changes of the embryos under the biochip clearly under the curved surface. Since the hydrogel is also in solution state before curing, the filling of hydrogel also faces the same problem. The curved surface of the solution is remained after curing, which affects the optical effect in later applications, and it is impossible to observe the morphological changes of the embryos under the biochip clearly under the curved surface. To solve this problem, referring to FIGS. 5 to 7, a transparent baffle 18 is provided above the biochip which covers the middle part of the section region. When a sealing film is attached to the bottom of the biochip, the section of the biochip is formed into a structure with holes at two sides and hollow in the middle.

Figure 8:
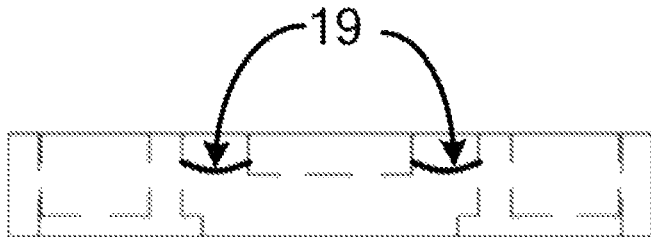
FIG. 8 is a schematic diagram showing the curved surface shown in FIG. 7.

Referring to FIG. 8, in the case of freezing or thawing using a hydrogel, the hydrogel solution can be filled into the interior of the section from one of the holes on the two sides of the transparent baffle. Because of the baffle, the solution will fill the entire hollow structure without forming a curved surface under the baffle, and the curved surface 19 will only appear at the edges of the holes on the two sides of the baffle, without affecting the observation of the optical path of the embryos in the recess of the carrier by using a microscope when being used. After the hydrogel is cured, a sealing film can be attached to the top of the biochip. Please refer to the above description for the subsequent operation steps, which will not be repeated here.

Continuing with reference to FIG. 8, in the case of freezing or thawing using a solution, when the biochip is used, it is placed following the indicated direction so that the biochip is closely attached above the carrier, and the desired solutions are then added into suitable sections within the section region from the holes on the two sides of the transparent baffle (for example, ES and VS are added in the freezing application, and TS, DS and WS are added in the thawing application). Because of the baffle, the solution will fill the whole hollow structure without forming a curved surface under the baffle, and the curved surface 19 will only appear at the edges of the holes on the two sides of the baffle, without affecting the observation of the optical path of the embryos in the recess of the carrier by using a microscope when being used. The biochip is then moved relative to the carrier. Please refer to the above description for subsequent operation steps, which will not be repeated here.

The above descriptions are only embodiments of the invention, and are not intended to limit the invention. For persons skilled in the art, various modifications and changes can be made to the invention. Any modifications, equivalent replacements, improvements, etc. made within the spirit and principles of the invention shall be included within the scope of the claims of the invention.

What is claimed is:

1. A biochip for cryopreservation or thawing and resuscitation of biological tissue, with four ends of the biochip being of a closed structure, the biochip comprising:
   a section region arranged in a middle and comprising a plurality of sequentially arranged sections, with partition plates between the sections, and a bottom of each section comprising a fixing groove; and
   joint portions on two sides of the section region.

2. The biochip according to claim 1, wherein the bottom of the section region comprises a sealing film that forms the plurality of sections into a plurality of recesses.

3. The biochip according to claim 2, wherein the sealing film comprises a direction mark.

4. The biochip according to claim 1, wherein the bottom of the section region comprises a permeable film that forms the plurality of sections into a plurality of recesses.

5. The biochip according to claim 1, wherein one end of the biochip comprises one or two chamfers or bevels.

6. The biochip according to claim 1, wherein a transparent baffle is above the biochip, and the transparent baffle covers a middle part of the section region.

7. The biochip according to claim 1, wherein the section region is configured to have two, three or four sections.

* * * * *